United States Patent
Benishti

(10) Patent No.: US 9,294,502 B1
(45) Date of Patent: Mar. 22, 2016

(54) METHOD AND SYSTEM FOR DETECTION OF MALICIOUS BOTS

(71) Applicant: Radware, Ltd., Tel Aviv (IL)

(72) Inventor: Eyal Benishti, Giv'atayim (IL)

(73) Assignee: Radware, Ltd., Tel Aviv (IL)

(*) Notice: Subject to any disclaimer, the term of this patent is extended or adjusted under 35 U.S.C. 154(b) by 0 days.

(21) Appl. No.: 14/182,869

(22) Filed: Feb. 18, 2014

Related U.S. Application Data

(60) Provisional application No. 61/912,805, filed on Dec. 6, 2013.

(51) Int. Cl.
*G06F 21/56* (2013.01)
*H04L 29/06* (2006.01)

(52) U.S. Cl.
CPC .................... *H04L 63/145* (2013.01)

(58) Field of Classification Search
CPC ....... G06F 11/00; G06F 21/554; G06F 21/56; G06F 3/0484; H04L 63/0263; H04L 63/1416
USPC ................ 726/22–27; 713/168–169; 707/709
See application file for complete search history.

(56) References Cited

U.S. PATENT DOCUMENTS

| | | | |
|---|---|---|---|
| 7,818,572 B2 * | 10/2010 | Stewart et al. | 713/169 |
| 7,895,653 B2 | 2/2011 | Calo et al. | |
| 8,490,187 B2 * | 7/2013 | Rubin et al. | 726/22 |
| 8,555,388 B1 | 10/2013 | Wang et al. | |
| 8,838,570 B1 * | 9/2014 | English | 707/709 |
| 2010/0281539 A1 | 11/2010 | Burns et al. | |
| 2011/0208714 A1 | 8/2011 | Soukal et al. | |
| 2012/0084146 A1 | 4/2012 | Zwicky | |
| 2013/0198203 A1 | 8/2013 | Bates et al. | |
| 2013/0290719 A1 * | 10/2013 | Kaler et al. | 713/168 |

* cited by examiner

*Primary Examiner* — Thanhnga B Truong
(74) *Attorney, Agent, or Firm* — M&B IP Analysts, LLC

(57) ABSTRACT

A computerized method and system for detecting access of a protected server by malicious bots are provided. The method comprises receiving a request from a client machine; generating a polymorphic script code challenge that includes a scrambled secret; sending the polymorphic script code challenge to the client machine in response to the received request; receiving a token from the client machine in response to the polymorphic script code challenge; comparing contents of the token to the secret in its unscrambled form; and determining the client machine to be a malicious bot in an event including any one of the token does not match the secret and a token has not been received, wherein a new polymorphic script code challenge containing a new scrambled secret is generated for each new request received from a client machine.

17 Claims, 5 Drawing Sheets

METHOD AND SYSTEM FOR DETECTION OF MALICIOUS BOTS

CROSS-REFERENCE TO RELATED APPLICATIONS

This application claims the benefit of U.S. Provisional Application No. 61/912,805 filed Dec. 6, 2013, the contents of which are incorporated herein by reference.

TECHNICAL FIELD

This invention generally relates to implementation of security techniques for detecting malicious bots, and particularly to the implementation of scripting techniques for bots detection.

BACKGROUND

A significant problem facing the Internet community is that on-line businesses and organizations are vulnerable to malicious attacks. Recently, attacks have been committed using a wide arsenal of attack techniques and tools targeting both the information maintained by the online businesses and their IT infrastructure. For example, recently identified attacks have been committed using a combination of attack techniques at the network and application levels. Attackers use different tools to execute different attack techniques. Each such attack tool is designed to exploit weaknesses identified in one of the target's defense layers.

An example for such an attack tool is a Web robot, also known as a botnet or bot (which will be referred to hereinafter as a "bot"). A bot is a software application programmed to execute automated tasks over the Internet. Typically, bots are programmed to perform tasks that are simple and structurally repetitive at higher rate than a human end user. Commonly, malicious users often use a bot as a means to execute denial-of-service (DoS) attacks, HTTP or HTTPS flood attacks, click frauds, and to spam large amounts of content over the Internet.

Anti-bot techniques typically attempt to verify that a transaction is initiated by a legitimate client application (e.g., web browser) and is under control of the user. Examples for such techniques are a SYN cookie, a web redirect (e.g., 302 HTTP redirect message), a JavaScript challenge, CAPTCHA, and the like.

In a CAPTCHA action, an image is sent to the user device. The image includes alphanumeric characters that are difficult to recognize for an OCR program, but are visible to a human. The user is verified if the characters as entered by the user correspond to the characters in the image.

The JavaScript challenge requires the client (web browser) to include a JavaScript engine (or enable execution of a JavaScript) in order to view the web page or to perform any action in a webpage. Other JavaScript redirect challenges invite the browser on the client device to respond to such a message by a request for a new URL specified in the redirected message, or to wait for an input from the user. The SYN cookie techniques validate the IP address of the client issuing the transaction. However, such a technique can be easily bypassed by an attack tool (or an application) that owns a real IP address (not a spoofed address). Current attack tools executing bots are designed to implement redirection mechanisms by default. For example, the JavaScript redirect challenge can be bypassed using a parser and without any JavaScript engine operable in the attack tool. A simple parser is sufficient to bypass the challenge as the JavaScript are static with constant information that should be revealed.

The CAPTCHA action has been determined to be more effective, over the other actions, in confirming that a transaction is issued by a human and not malware. However, at the same time, this technique negatively affects the user experience while accessing the web services. The redirect challenges, on the other hand, are seamless for a legitimate user.

Therefore, it would be advantageous to provide an efficient solution for detecting malicious bots and verifying legitimate clients.

SUMMARY

Certain embodiments disclosed herein include a computerized method for detecting access of a protected server by malicious bots. The method comprises receiving a request from a client machine; generating a polymorphic script code challenge that includes a scrambled secret; sending the polymorphic script code challenge to the client machine in response to the received request; receiving a token from the client machine in response to the polymorphic script code challenge; comparing contents of the token to the secret in its unscrambled form; and determining the client machine to be a malicious bot in an event including any one of the token does not match the secret and a token has not been received, wherein a new polymorphic script code challenge containing a new scrambled secret is generated for each new request received from a client machine.

Certain embodiments disclosed herein also include a system for detecting access of a protected server by malicious bots. The system comprises a processor; a network-interface for communicating with at least a client machine; a memory connected to the processor and configured to contain a plurality of instructions that when executed by the processor configure the system to: receive a request from the client machine; generate a polymorphic script code challenge that includes a scrambled secret; send the polymorphic script code challenge to the client machine in response to the received request; receive a token from the client machine in response to the polymorphic script code challenge; compare contents of the received token to the secret in its unscrambled form; and determine the client machine to be a malicious bot in an event including any one of the token does not match the secret and a token has not been received, wherein a new polymorphic script code challenge containing a new scrambled secret is generated for each new request received from a client machine.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
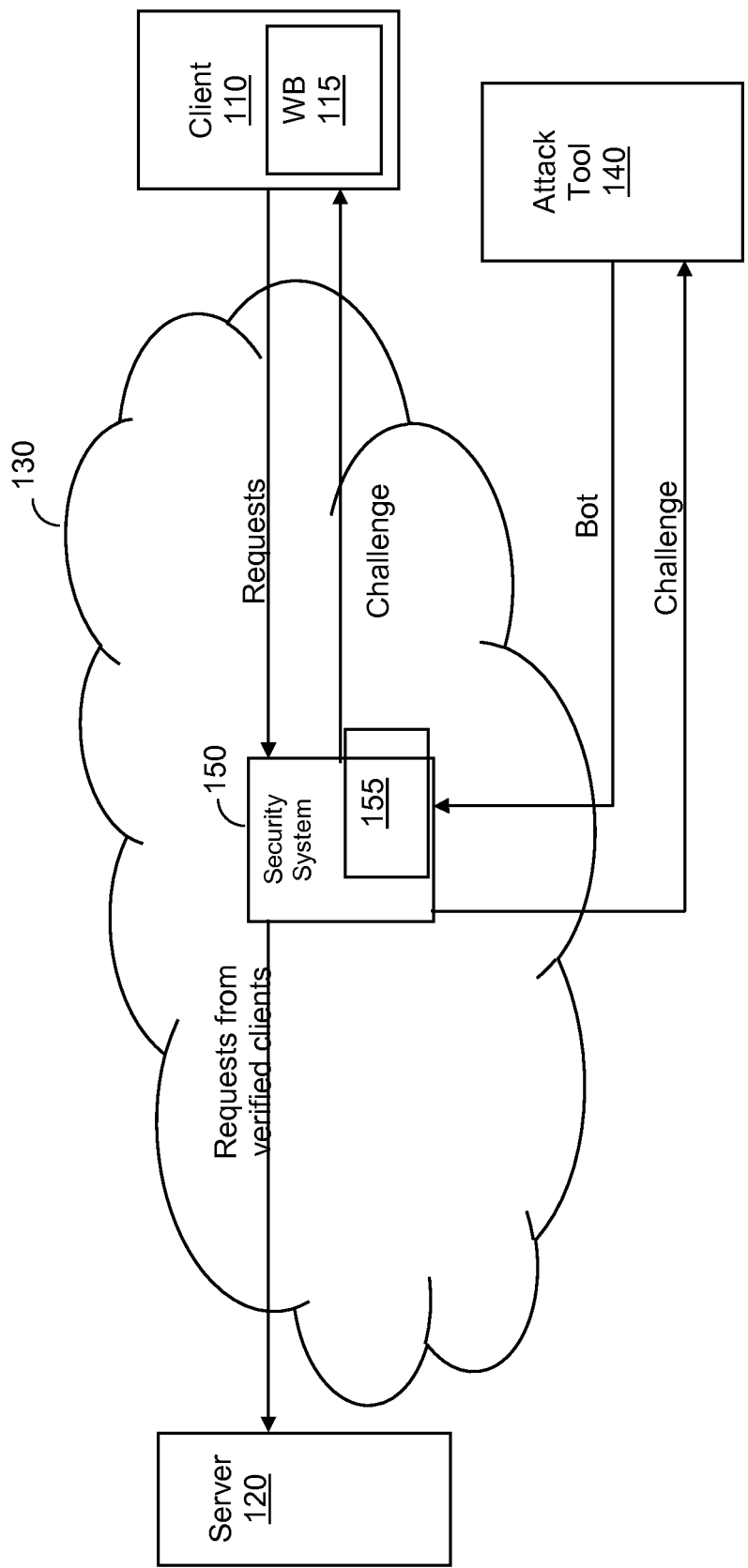
FIG. 1 illustrates a network system utilized to describe the various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 illustrates an exemplary and non-limiting diagram of a network system 100 utilized to describe the various disclosed embodiments. In the system 100, a client 110 communicates with a server 120 over a network 130. The server 120 is the entity to be protected from malicious threats. The client 110 and server 120 communicate using communication protocols, such as a hypertext transfer protocol (HTTP), HTTPS, and the like. The client 110 is a legitimate client that executes a web browser 115 with a JavaScript engine enabled. An attack tool 140 is also communicatively connected to the network 103. The attack tool 140 executes a bot being programmed to carry out malicious attacks against the server 120. As noted above, such attacks may be DoS/DDoS, click frauds, spams, HTTP/HTTPS flood, and the like.

The network 130 may be, but is not limited to, a local area network, a wide area network, the Internet, a cellular network, a metropolitan area network (MAN), or any combination thereof. It should be noted that although one client 110, one server 120, and one attack tool 140 are depicted in FIG. 1 merely for the sake of simplicity, the embodiments disclosed herein can be applied to a plurality of clients, attack tools and servers. Thus, the embodiments disclosed herein can be utilized to detect a large scale attack campaign where a vast number of attack tools participate in attacking the protected entity, i.e., the server 120. The clients may be located in different geographical locations. The servers may be part of one or more datacenters, a cloud-computing infrastructure, server frames, or combinations thereof. The server 120 may be, but is not limited to, a web server, an application server, and the like.

In accordance with one embodiment, illustrated in FIG. 1, a security system 150 is connected in-line with the server 120 (i.e., an in-line deployment). The security system 150 is configured to receive requests (HTTP/HTTPS requests) generated by the client 110 and/or attack tool 140. The requests are directed to the server 120.

In an embodiment, the security system 150 includes a verification module 155 being configured to generate a difficult challenge for the attack tool to pass. The generated challenge can be resolved by the client 110 without impacting the performance of serving the client's request and/or requiring additional computing resources from the client 110. That is, any client running a web browser can seamlessly bypass the challenge.

In an embodiment, the challenge generated by the verification module 155 is a JavaScript challenge. As will be described in detail below, the verification module 155 is configured to generate and send a secret to a machine (i.e., the client 110 or attack tool 140) requesting to access the server 120. The machine that receives the module's 155 challenge, on its end, requires parsing and interpreting the secret using the JavaScript engine executed, e.g., by its web browser 115 and setting a token based on the processing results. The token is then sent to the verification module 155 which checks if the token matches the secret. In an embodiment, the token may be a web cookie or any other data structure that can serve for this purpose.

In one embodiment, the verification module 155 embeds the secret in a script code, such as a JavaScript, or any Script programming languages. The verification module 155 is configured to generate, for each received request, a new script that includes a new secret to be discovered by the client 110 (or the attack tool 140) sending the request. In order to discover the secret the client 110 should be configured to enable execution of a JavaScript engine in its browser 115. As will be demonstrated below, the script code generated by the verification module 155 is polymorphic and cannot be interpreted by an attack tool 140 implementing parsing programs or lightweight JavaScript interpreters. Therefore, the attack tool 140 or hackers using such a tool would not be able to reverse the generated challenges or to code an automated process for parsing and extracting the challenge from the script code.

In an embodiment, the generated challenge requires a human interaction challenge as another layer of verification. The human interaction may include a mouse movement, a mouse pointing, a drag-and-drop action, and so on.

The polymorphism of the script code is realized by using a different new secret and different semantic phrase to reveal the secret in each new script sent to the client or attack tool. The secret is randomly generated or selected form a pool of secrets that can be used. In an exemplary embodiment, the secret is a string of characters. The secret is broken into atom units that are stored in temporary variables in a random order. An atom unit is a smallest portion of the secret. For example, an atom unit may be a single character or a bit. To add a further barrier to the script code, fake atom units that are not part of the secret are placed in dummy variables. The temporary and dummy variables are part of the script code. The method for generating the code is described in detail with respect to FIG. 3.

The verification module 155 is configured to authenticate the client 110 only if the token returned in response to the execution of the script code by the client 110 matches the secret. Upon such an authentication, the verification module 155 relays the received request to the server 120, or causes the client 110 to resend the request to the server 120. In an embodiment, the request is relayed over a new session established between the client 110 and server 120. If the authentication fails, the client 110 or the attack tool 140 is blocked from accessing the server 120. In one embodiment, the attack attempt is reported to a security administrator. Such a report may include information about the type of attack and the attacker (e.g., an IP address, a geographical location, and a type of the attack tool).

Figure 2:
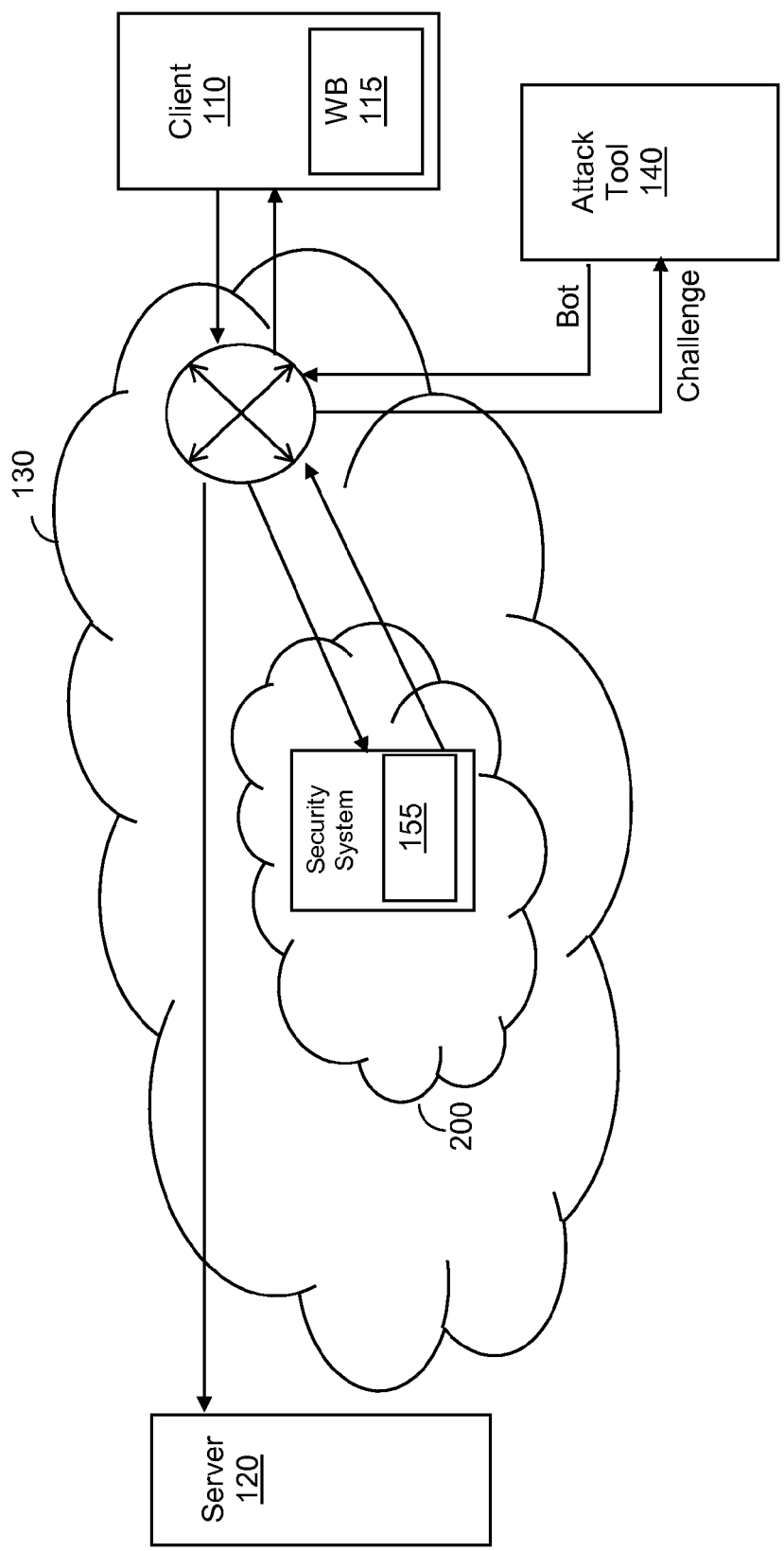
FIG. 2 illustrates an off-path deployment of a security system configured to carry the disclosed embodiments.

In one embodiment, the verification module 155 can be implemented in the server 120. In another embodiment, illustrated in FIG. 2, the security system 150, and hence the verification module 155 can be deployed off-path of the server 120 in a secured datacenter 200. In this embodiment, suspicious requests can be diverted to the secured datacenter 200 for authentication. The secured datacenter 200 can be operable in a cloud-system infrastructure, a hosting server datacenter, service provider networks, or a cooperative network.

Figure 3:
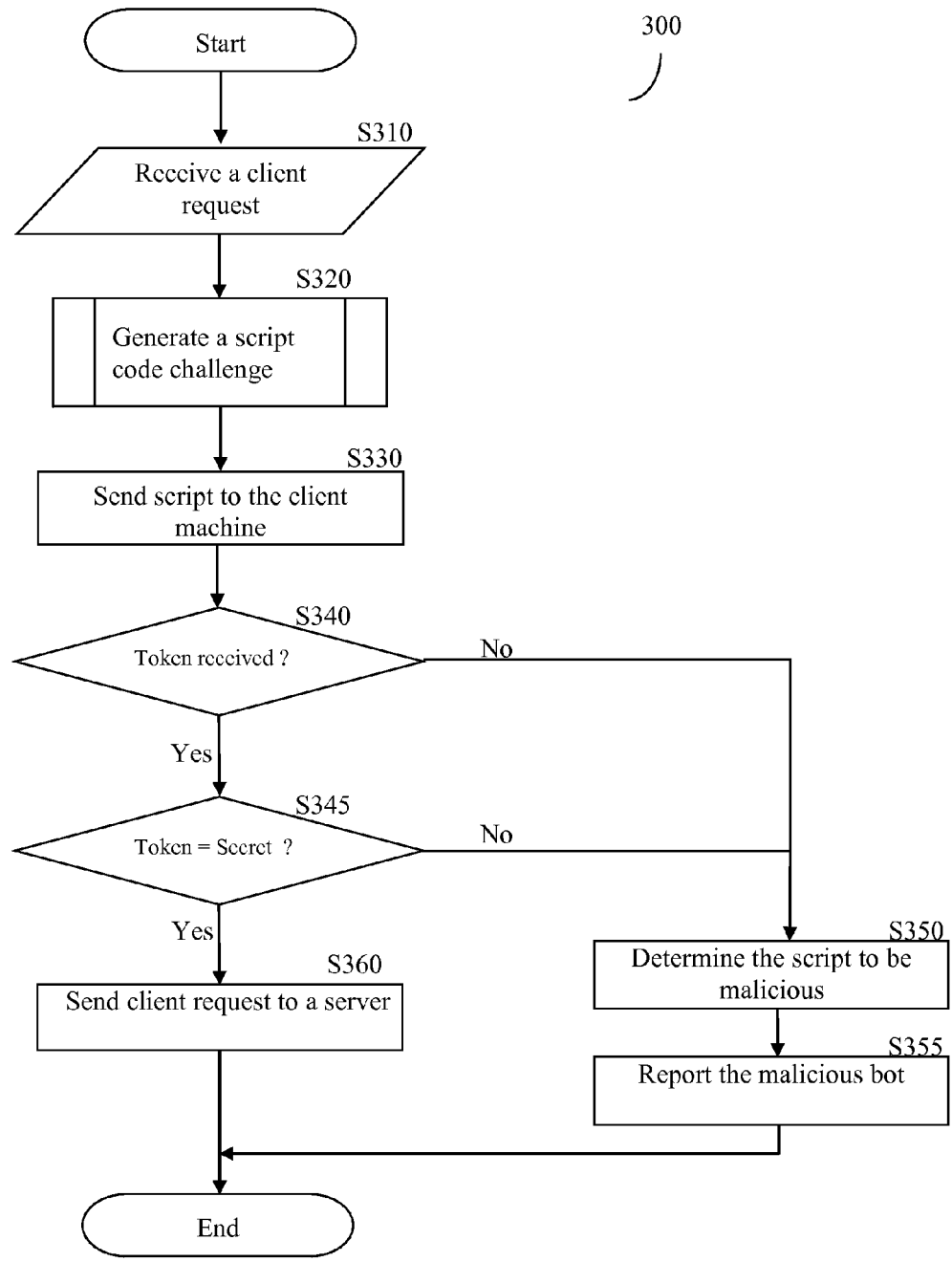
FIG. 3 is a flowchart describing a method for detecting malicious bots according to one embodiment.

FIG. 3 is an exemplary and non-limiting flowchart 300 describing the operation of the verification module according to one embodiment. At S310, a request to access a resource of a protected server is received from a client machine. The request may be, for example, HTTP or HTTPS request. The client machine may be a legitimate client or an attack tool executing a bot. At S320, a polymorphic script code challenge is generated. The challenge includes a secret that should be reassembled by the client machine. In an embodiment, the script code challenge is JavaScript code. The execution of S320 is described in detail above. At S330, the generated script is sent to the client machine.

At S340, it is checked if a token has been received, from the client machine, in response to the script code. If a token is received, execution continues with S345; otherwise, execution proceeds to S350, where the received request is determined to be malicious. Optionally at S355, details about the client machine sending the malicious request are gathered and reported. Such details include, but are not limited to, an IP address, a geographical location, type of the machine, request type, and so. The waiting time for receiving a token may be preconfigured and can be set to a typical round trip time (RTT) between the protected server and security system.

At S345, the received token is analyzed to determine if the secret is included therein. If so, the client machine passes the challenge and the machine is authenticated; otherwise, execution proceeds to S350. If the client machine is authenticated, at S360, the client request received at S310 is relayed to the server. Alternatively, the verification module causes the client machine to resent the request to the server (e.g., server 120). It should be noted that subsequent requests from an authenticated client machine are directly forwarded to the server without re-performing the authentication procedure for that client. In an embodiment, an authenticated client remains authenticate for a pre-defined time interval (e.g., 5 minutes). Once this pre-defined time interval has elapsed, a re-authentication of the client is required. In another embodiment, the re-authentication is triggered by a security event that has been flagged against the client.

Figure 4:
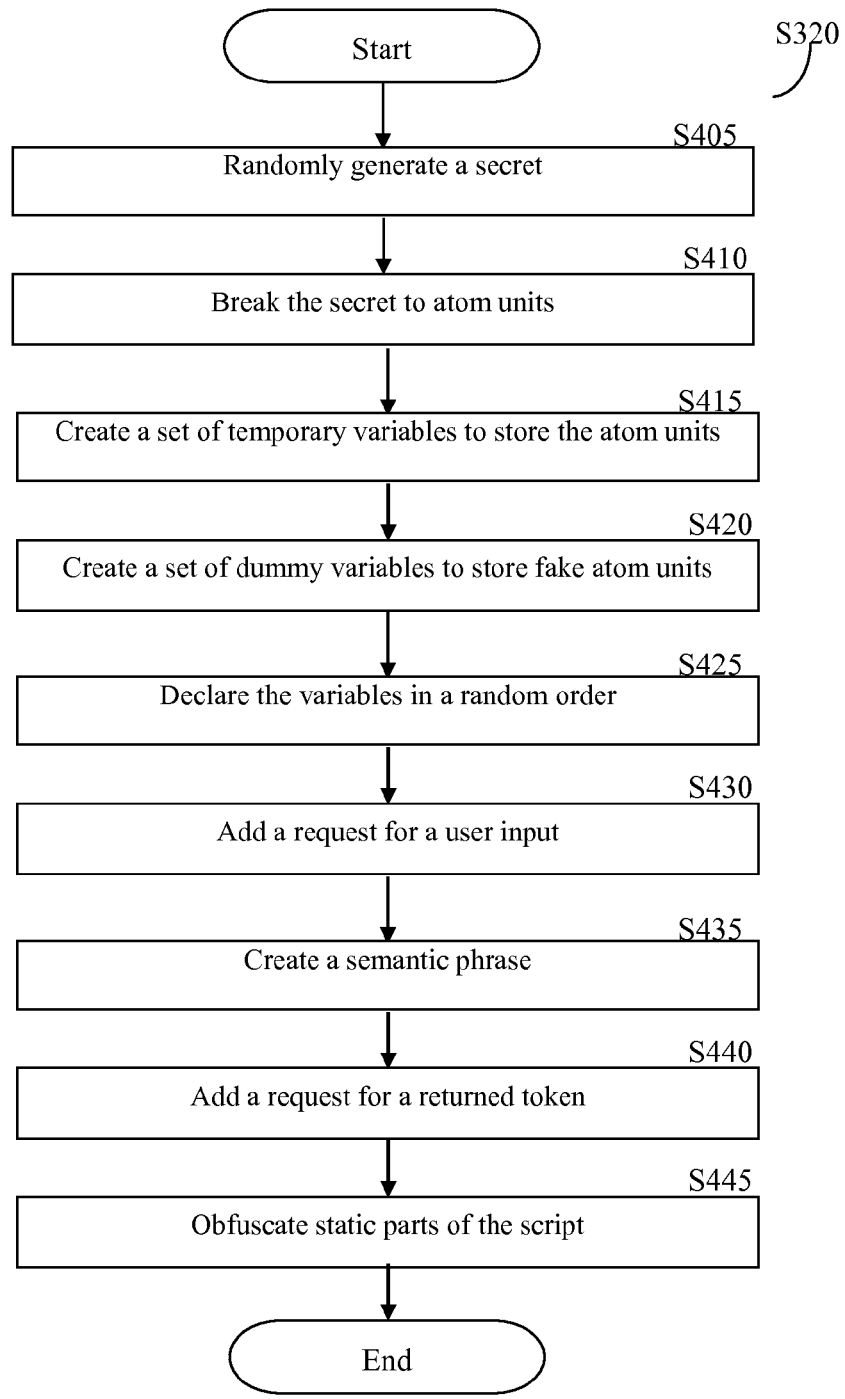
FIG. 4 is a flowchart describing a method for generating polymorphic script code challenge utilized to verify the client machines according to one embodiment.

FIG. 4 shows an exemplary and non-limiting flowchart S320 describing the process for generating a script code challenge according to one embodiment. At S405, a secret is randomly generated using a random function computed over a set of dynamic values. The dynamic values include, but are not limited to, a MAC address of the client machine, a time stamp, a random number, and so. This ensures that for each received new client request a new secret would be provided that does not match previously provided secrets. In an embodiment the secret is randomly selected from a pool of pre-generated secrets. In an exemplary embodiment, the secret is a string of characters.

At S410, the secret is broken into atom units. As noted above, an atom unit defines a smallest portion of the secret. At S415, a set of temporary variables are created to store the atom units. The name and length of each temporary variable are randomly determined. S415 would result in a script code that declares and assigns a value (i.e., an atom unit) to each temporary variable.

At S420, a set of dummy variables are created to store fake atom units. As noted above, the fake atom units are not part of the secret. For example, the fake atom units may be a character such as a '@', '#', '$', etc. or symbols such as a smiley face. S420 would result in a script code that declares and assigns a value (i.e., a fake atom unit) to each dummy variable. The execution of S405 through S420 would result in a scrambled secret respective of the generated secret.

At S425, the dummy and temporary variables are declared in the script in a random order. That is, variables are declared not according to the order of their respective values in the secret. Optionally, at S430, a request to a user input is added to the script code. The user input may be an interaction of the user (human) with an input/output device connected to the client machine, for example, a request for a mouse click, a mouse movement, and so on.

At S435, a semantic phrase required to solve the puzzle and reveal the secret is created and added to the script code. The semantic phrase is a combination of the dummy and temporary variables connected with logic operators. In an embodiment, the result of each logic operator is either False or True defining which of the variables is part of the secret. The list of the logic operators that can be utilized for the semantic phrase is preconfigured. In another embodiment, the semantic phrase used at S435 can be generated from a list of pre-generated semantic phrases.

At S440, a request to send a token with the revealed secret is added to the code. As noted above, the token may be in a form of a web cookie. At S445, static parts of the script code are obfuscated. The static parts are code lines often required for the proper interpretation of the code by a JavaScript engine. Such code lines can be obfuscated by any obfuscation techniques known in the related art. Once the generation of the script code challenge is completed, the script is sent to the client machine for execution thereto.

Following is an exemplary and non-limiting JavaScript challenge generated according to the disclosed embodiments.

```
<html><body>
<script>
var
$U='p';$Y='p';$u='p';$x='6';$7='p';$W='=';$p='p'; $8='p';
  $e='p';$2='p';$I='7';$k='d';$D='p';$i='p';$B='6';$P='7';
  $E='3';$G='p';$r='p';$0='=';$q='6';$M='3';$b='1';
  $H='1';$J='p';$o='7';$z='3';$1='b';$y='d';$a='e';$S='7';
  $m='1';$h='p';$C='p';$V='p';$4='p';$t='p';$v='p';
  $R='p';$w='_';$N='6';$9='7';$j='3';$X='b';$I='d';$f='e';
  $K='7';$L='1';     document.cookie=(!0?$U:"")+
  (!NaN?$Y:"")+(!☐ ?$u:"")+(!☐ ?$x:"")+(!({})?$7:"")+
  (!4?$W:"")+(!({})?$p:"")+(!☐ ?$8:"")+(!NaN?$e:"")+
  (!NaN?$2:"")+(!({})?$I:"")+(!☐ ?$k:"")+(!({})?$D:
  "")+(!""?$i:"")+(!4?$B:"")+(!4?$P:"")+(!☐ ?$E:"")+
  (!""?$G:"")+(!0?$r:"")+(!NaN?$0:"")+(!NaN?$q:"")+
  (!({})?$M:"")+(!4?$b:"")+(!({})?$H:"")+(!4?$J:"")+
  (!NaN?$o:"")+(!0?$z:"")+(!""?$1:"")+(!0?$y:"")+
  (!NaN?$a:"")+(!0?$S:"")+(!NaN?$m:"")+(!""?$h:"")+
  (!""?$C:"")+(!NaN?$V:"")+(!NaN?$4:"")+(!0?$t:"")+
  (!""?$v:"")+(!""?$R:"")+(!""?$w:"")+(!NaN?$N:"")+
  (!""?$9:"")+(!0?$j:"")+(!0?$X:"")+(!NaN?$I:"")+
  (!NaN?$f:"")+(!NaN?$K:"")+(!0?$L:"")+';
path='/';window.location.href=window.location.href;
</script>
</body></html>
```

Figure 5:
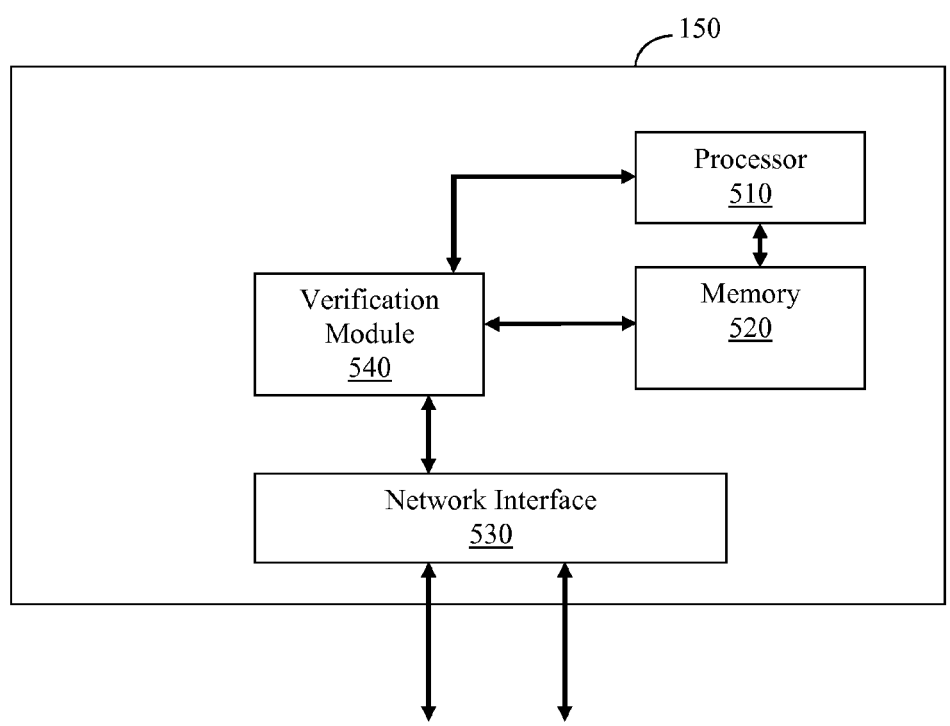
FIG. 5 is a block diagram of a security system for detecting malicious bots and verifying client machines according to one embodiment.

In the exemplary script, the secret is "challenege7". The atom unit is one character. The atom units are scrambled through variable definitions in the 'var' section. The schematic phrase is defined in the document.cookie section. In the exemplary script, the code line window.location.href=window.location.href can be obfuscated, for example, to the following code line:
var _0xb3bb=["\x68\x72\x65\x66", "\x6C\x6F\x63\x61\x74\x69\x6F\x6E"];window[_0xb3bb[1]][_0xb3bb[0]]=window[_0xb3bb[1]][_0xb3bb[0]];

FIG. 5 shows an exemplary and non-limiting block diagram of the security system 150 constructed according to one embodiment. The system 150 is configured to verify client machines accessing a protected server and to detect malicious bots. The security system 150 includes a processing unit 510 coupled to a memory 520, a network interface 530 and a verification module 540.

The network interface 530 allows the communication with client machines and a protected server through a network (e.g., a network 130). The verification module 540 is configured to receive requests and tokens from a client machine and determine if the client runs a malicious bot. The operation of the module 540 is discussed in greater detail with reference to FIGS. 3 and 4 above. The processing unit 510 may include one or more processors. The memory 520 may comprise volatile and/or non-volatile memory components, including but not limited to the likes of static random access memory (SRAM), dynamic random access memory (SRAM), Flash memory, magnetic memory and other tangible media on which data and/or instructions may be stored.

The memory 520 may contain instructions that when executed by the processing unit 510 controls, for example and without limitations, the operation of the verification module 540 to perform the verification and detection processes described in more detail in above. The memory 520 may also include a preconfigured list of secrets and logic operators required in defining the semantic phrases.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for detecting access of a protected server by malicious bots, comprising:
   receiving a request from a client machine;
   randomly generating a secret using a random function computed over a set of dynamic values;
   scrambling the secret by changing an order of atom units of which the secret is comprised
   breaking the secret into a plurality of atom units, wherein each of the atom units is a smallest portion of the secret;
   selecting at least one fake atom unit that is not included in the secret;
   storing the plurality of atom units and the at least one fake atom unit in variables;
   declaring the variables in a polymorphic script code in a random order;
   sending the polymorphic script code as a challenge to the client machine in response to the received request;
   receiving a token from the client machine in response to the polymorphic script code challenge;
   comparing contents of the token to the secret in its unscrambled form; and
   determining the client machine to be a malicious bot if the token does not match the secret, wherein a new polymorphic script code challenge containing a new scrambled secret is generated for each new request received from a client machine.

2. The method of claim 1, further comprising:
   relaying the request to the protected server if the token matches the secret.

3. The method of claim 1, further comprising:
   generating a report containing information about the malicious bot, wherein the information includes at least an IP address, a geographical location, and a type of the attack tool.

4. The method of claim 1, wherein the least one fake atom unit is saved in a dummy variable.

5. The method of claim 1, further comprising:
   adding a semantic phrase to the script code, wherein the semantic phrase includes a set of logic operators required to reveal the secret; and
   adding a request to send the token back from the client machine.

6. The method of claim 5, further comprising:
   adding a request to a user input, wherein the user input includes an interaction of the user with an input/output device connected to the client machine.

7. The method of claim 1, wherein the script code is at least a JavaScript.

8. A non-transitory computer readable medium having stored thereon instructions for causing one or more processing units to execute the computerized method according to claim 1.

9. A system for detecting access of a protected server by malicious bots, comprising:
   a processor;
   a network-interface for communicating with at least a client machine;
   a memory connected to the processor and configured to contain a plurality of instructions that when executed by the processor configure the system to:
   receive a request from the client machine;
   generate a secret using a random function computed over a set of dynamic values;
   scramble the secret by changing an order of atom units of which the secret is comprised
   break the secret into a plurality of atom units, wherein each of the atom units is a smallest portion of the secret;
   select at least one fake atom unit that is not included in the secret;
   store the plurality of atom units and the at least one fake atom unit in variables;
   declare the variables in a polymorphic script code in a random order;
   send the polymorphic script code as a challenge to the client machine in response to the received request;
   receive a token from the client machine in response to the polymorphic script code challenge;
   compare contents of the received token to the secret in its unscrambled form; and determine the client machine to be a malicious bot if the token does not match the secret, wherein a new polymorphic script code challenge containing a new scrambled secret is generated for each new request received from a client machine.

10. The system of claim 9, wherein the system is further configured to relay the request to the protected server if the token matches the secret.

11. The system of claim 9, wherein the system is further configured to generate a report containing information about the malicious bot, wherein the information includes at least an IP address, a geographical location, and a type of the attack tool.

12. The system of claim 9, wherein the least one fake atom unit is saved in a dummy variable.

13. The system of claim 9, wherein the system is further configured to:
add a semantic phrase to the script code, wherein the semantic phrase includes a set of logic operators required to reveal the secret; and
add a request to send the token back from the client machine.

14. The system of claim 13, wherein the system is further configured to
add a request to a user input, wherein the user input includes an interaction of the user with an input/output device connected to the client machine.

15. The system of claim 13, wherein the script code is at least a JavaScript.

16. The system of claim 9, wherein the system is deployed in-line of traffic between the protected server and the client machine.

17. The system of claim 9, wherein the system is deployed as a secured datacenter off the path of the protected server, wherein the secured data is operable in at least one of a cloud-system infrastructure, a hosting server datacenter, a service provider network, or a cooperative network.

* * * * *